July 1, 1952

G. ZINDEL, JR 2,601,841

ILLUMINATED INDICATOR

Filed Nov. 14, 1949

INVENTOR.
GEORGE ZINDEL, JR.
BY
Brown, Denk & Synnestvedt
AGENTS

Patented July 1, 1952 2,601,841

UNITED STATES PATENT OFFICE 2,601,841

ILLUMINATED INDICATOR

George Zindel, Jr., Fox Chase Manor, Pa., assignor to Philco Corporation, Philadelphia, Pa., a corporation of Pennsylvania Application November 14, 1949, Serial No. 127,153

2 Claims. (Cl. 116—124.4)

The invention hereinafter described and claimed has to do with television apparatus and, more particularly, relates to controlling and indicating means for such apparatus. The concepts of the invention are of particular utility as applied to the problem of visually indicating the tuning adjustment of television receivers.

Provision of such visual indication, in the field of television apparatus, presents problems peculiar to that art. For example, use of an illuminated dial has been disadvantageous in that the presence of extraneous lights, particularly in the vicinity of the image screen, is annoying and distracting to those viewing the picture. Further, it has been recognized that a source of light situated in the vicinity of the viewing screen serves—to an extent dependent upon the brightness of said source—to reduce the iris opening in the eye of the viewer, thus seriously interfering with proper viewing of the images displayed upon the screen. By reason of the foregoing, and other difficulties and disadvantages, illuminated dials or other types of illuminated indicators have not generally been utilized in television receiving equipment. The absence of an illuminated dial has made such apparatus difficult to tune and adjust, particularly since television receivers are frequently utilized in darkened or only semilighted rooms.

With the foregoing in mind, it is the principal objective of the present invention to provide for clear and distinct indications of the adjustment of the receiver—when the operator is in a position to effect such adjustments—while yet presenting no interference with proper viewing of the screen of the receiver.

With more particularity, it is a feature of the present invention to provide for the tuning, or other adjustment of a television receiver, by the use of an illuminated dial or scale which is completely invisible from the normal picture viewing position.

In the achievement of the foregoing objectives, it has been recognized that when an operator is adjusting a television receiver the eye of the operator is relatively close to the receiver and is situated at a level above that of the controls. The picture is generally viewed, on the other hand, from a position or zone such that the eye of the viewer is relatively remote from the receiver and the line of sight approaches parallelism with the floor of the room. Thus, viewers generally occupy a seated position in a zone spaced forwardly of the receiver and at a distance the optimum range of which is rather sharply defined, being determined by the size of the screen and similar considerations. Recognizing the importance of these factors, the invention provides a source of light cooperative with a dial, or other adjustable indicating means, to provide a visual indication of the adjustment of the channel selector or other receiver elements to be controlled. In particular accordance with the invention, the illuminated indicating dial is provided with means limiting the direction of radiation of light from the source in such manner as to prevent radiation of light along the line of sight of viewers seated in the normal viewing zone, while yet providing for radiation of light from the dial along a line of sight displaced and, most conveniently, elevated with respect to the line of sight of said viewers.

The manner in which the foregoing, and other objects and constructional features of the invention, are realized, will be best understood from a consideration of the accompanying drawing, taken in conjunction with the following detailed description.

Figures 1, 2:
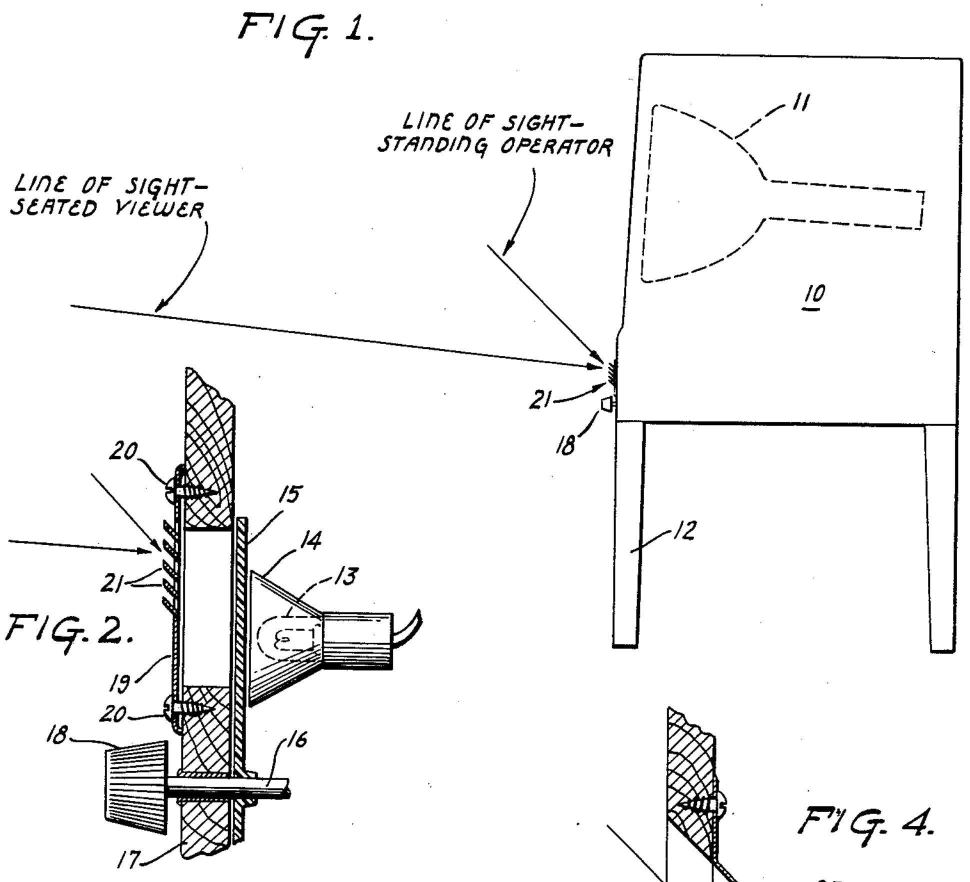
Figure 1 is a side, elevational view of a television receiver incorporating apparatus in accordance with the present invention, the figure including designation of the line of sight of seated viewers and an indication of the line of sight of an operator standing in position to adjust the receiver.
Figure 2 is a fragmentary sectional view, on an enlarged scale, illustrative of the novel light source and indicating means employed in the apparatus of Figure 1.

Now making more detailed reference to the figures of the drawing, and first with particular reference to Figures 1 and 2 thereof, it will be seen that the receiver illustrated by way of example is of the "consolette" type including a cabinet 10 housing a cathode ray tube 11, and being provided with legs 12 which serve to support the tube, and the other elements of the receiver, at the desired elevation with respect to the floor of a room. As will be understood, the cabinet 10, in addition to the cathode ray tube illustrated, houses the chassis of a complete television receiver. However, insofar as the present invention is concerned, the receiver and its adjusting instrumentalities may be of any desired type, and since the present invention is not concerned with the receiver or such instrumentalities, per se, illustration and description thereof is not necessary herein. Further, and as will appear more fully hereinafter, while illuminated dial means is illustrated and described, since the invention is concerned with such means, in the interest of simplicity in presentation of the invention, a showing of the channel selector is omitted. In the embodiments illustrated and described it is assumed that the novel indicating apparatus of the present invention is to be utilized in conjunction with a station or channel selector. Such illustration is, of course, merely exemplary, since the invention could as well be applied to indication of the position of any adjustable component of the receiver.

As clearly appears in Figure 2, the embodiment there illustrated includes a light source comprising a lamp 13 provided with a directive reflector 14, the resultant assembly being supported, in any desired manner, in cooperative relation with respect to a translucent or transparent dial member 15. The latter member is mounted for rotation in response to rotary movements of a control shaft 16, journalled in the forward wall 17 of the cabinet and which shaft is provided with a control knob 18. As will be understood, in practice, the shaft is extended into driving relation with a channel selector of any desired known type and, as a consequence, manipulation of the knob 18 serves not only to select the station or channel, but is also effective to rotate the dial member with respect to the light source 13—14. Indicia of any suitable type is provided upon the dial 15, being spaced about the surface thereof in position such that the portion of the dial which confronts the light source provides an indication of the rotary adjustment of the channel selector (not shown). The forward wall of the cabinet is apertured, in a region confronting the light source and the indicia-bearing portion of the dial member 15, in order that light radiated from the source may be visible from the front of the cabinet.

In particular accordance with the present invention, novel masking means shown at 19 is supported upon the forward surface of the wall 17, this masking means preferably taking the form of an escutcheon, or bezel plate, secured across the aforesaid opening, as by means of the screws 20. In the embodiment of Figures 1 and 2 the masking means takes the form of a plurality of horizontally extending louvers 21. These louvers are preferably of thin sheet material, for example sheet metal, and have such inclination with respect to the horizontal as to present openings generally aligned with the line of sight of a standing operator. The effectiveness of the louvers is plainly indicated by the arrows applied to the drawing, and it will be understood that light from the source is radiated between the louvers and in a direction along the line of sight of an operator standing in position to adjust the receiver. As is also shown in the drawing, the angularity of the louvers, with respect to the line of sight of seated viewers, is such as to prevent radiation of light from the indicating means in a direction such that the light may reach the normal viewing zone. Preferably the under surfaces of the louvers are coated with black material, in order to absorb light which might be reflected upon such under surfaces from the upper surface of an adjacent louver element. In this way the possibility of any light from the source reaching the normal viewing position is eliminated and, as will now be understood such elimination prevents interference with proper viewing of the images displayed upon the screen of the cathode ray tube 11.

Figure 3:
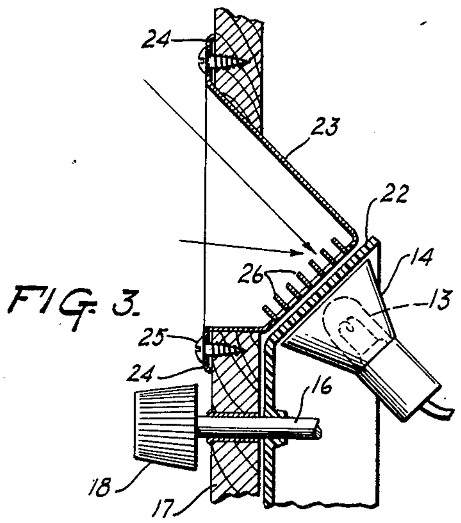

In the embodiment illustrated in Figure 3 a dial member 22, of frustro-conical configuration, is employed and the light source is disposed with its longitudinal axis normal to the surface upon which the indicia is displayed, and angled upwardly with respect to the horizontal. In this embodiment there is also provided a bezel 23 which is recessed rearwardly of the front wall 17 of the cabinet, and is mounted upon the cabinet through the agency of outwardly turned flanging 24 and screws 25. Bezel member 23 is provided with louvers 26 disposed in direct confronting relation with respect to the indicia-bearing portion of dial member 22 and, again, the angularity of the louvers is such that light from the source will be radiated along the line of sight of an operator standing before the receiver and radiation from said source is prevented, in the direction of the normal viewing zone.

Figure 4:
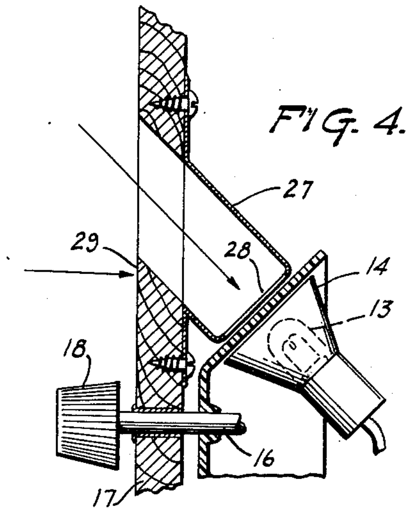
Figures 3 and 4 are fragmentary sectional views, similar to Figure 2, and illustrating modified embodiments of the invention.

The arrangement shown in Figure 4 is generally similar to that illustrated in Figure 3 and already discussed, the arrangement of Figure 4 differing in that there is provided a bezel 27 having a single aperture 28 confronting the light source, and of a width substantially equal to that of the shield member 14. This form of the invention presents certain advantages from the standpoint of simplicity. In place of the louvers employed in the other embodiments, the edges which define the lower portion of the opening through the wall of the cabinet extend upwardly, as at 28, a distance sufficient to prevent radiation of light from the source along the line of sight of seated viewers, while yet not interfering with radiation along the line of sight of a standing operator.

In the broader aspect of the invention and respecting each of the embodiments, the light source includes not only the lamp and shield assembly, but also the directional masking means. The essential condition to be fulfilled is that this over-all light source, or illuminated indicating device, be so constructed and arranged as to project light only in the direction of the region from which the television apparatus is adjusted.

From the foregoing description it will now be understood that the invention provides for the improvement of television apparatus, by making it possible to adjust the apparatus with ease, in a darkened room, and without in any way interfering with viewing of the images displayed upon the screen of the receiver, or necessitating the manipulation of a separate dial light control switch.

I claim:

1. In television apparatus, a screen adapted for the display of images to be viewed, said screen being visible to viewers situated in a predetermined zone forwardly of and spaced from said apparatus, a source of light, adjustable indicating means cooperative with said source to provide an indication of the adjustment of said apparatus, and louver means limiting the direction of radiation of the light from said source in such manner as to prevent radiation of light from said source along the line of sight of viewers situated in said zone and to provide for radiation of light from said source along a line of sight elevated with respect to the line of sight of the said viewers.

2. In television apparatus, a cabinet having a forwardly presented wall provided with an aperture therethrough, a screen supported in said cabinet, said screen being adapted for the display of images to be viewed and being visible from a predetermined viewing zone located forwardly of and spaced from said cabinet, a source of light disposed within the cabinet in substantially confronting relation with respect to the aforementioned aperture, adjustable dial means cooperative with said source to provide an indication through said aperture of the adjustment of said apparatus, and masking means effective to control radiation of light through said aperture and to prevent radiation in the direction of said viewing zone, said masking means comprising a plurality of louvers spaced to provide light-emitting passages therebetween, said passages being directed toward and providing for radiation in a region elevated with respect to said viewing zone.

GEORGE ZINDEL, JR.

REFERENCES CITED

The following references are of record in the file of this patent:

UNITED STATES PATENTS

| Number | Name | Date |
|---|---|---|
| 212,359 | Corbett et al. | Feb. 18, 1879 |
| 1,304,860 | Dole | May 27, 1919 |
| 1,603,444 | Bissell | Oct. 19, 1926 |
| 1,638,408 | Ratnour | Aug. 9, 1927 |
| 1,782,778 | Flanzer | Nov. 25, 1930 |
| 2,084,182 | Blain | June 15, 1937 |
| 2,242,750 | Jacobus | May 20, 1941 |
| 2,272,660 | Emde | Feb. 10, 1942 |
| 2,387,816 | Wagner | Oct. 30, 1945 |